E. A. SCHREIBER.
HOSE COUPLING.
APPLICATION FILED MAR. 6, 1919.
1,350,083.
Patented Aug. 17, 1920.
2 SHEETS—SHEET 1.
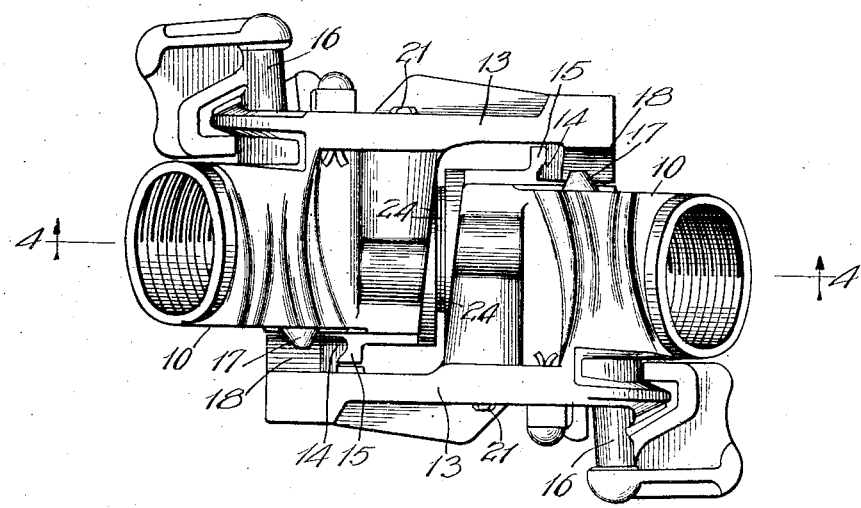
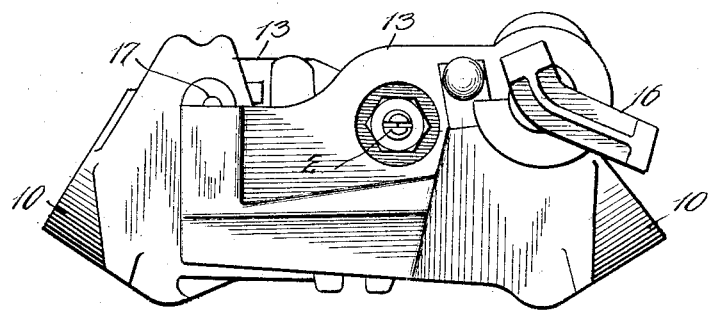
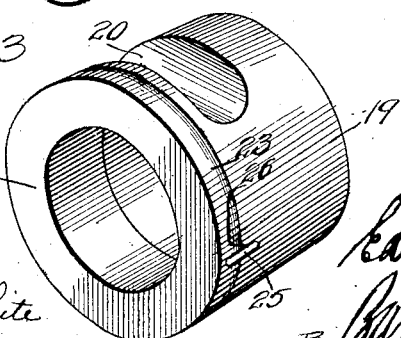

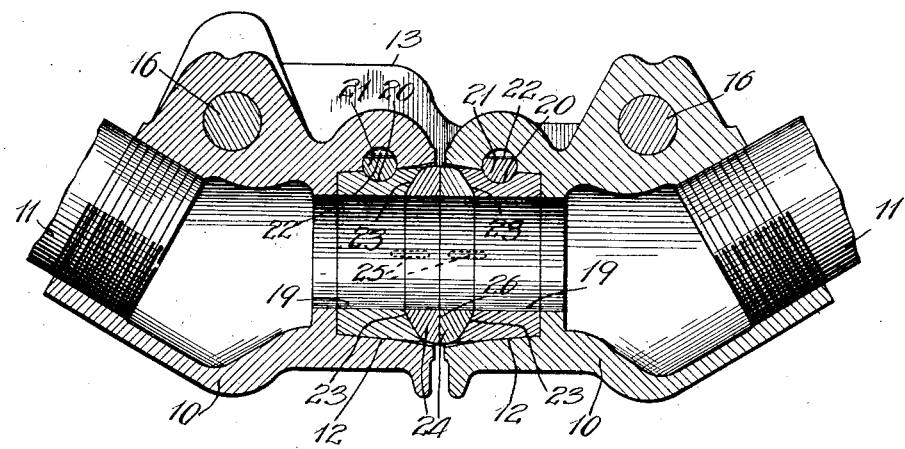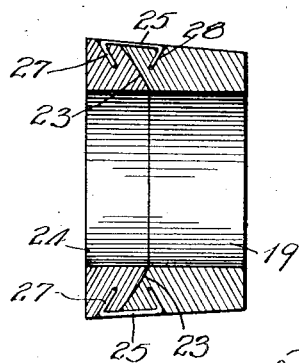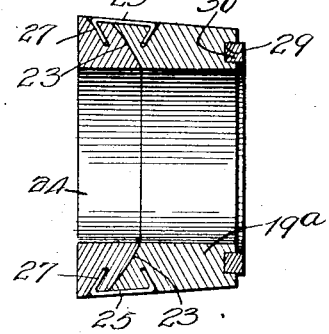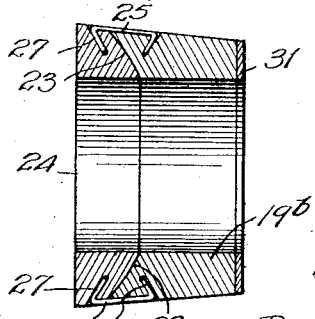

UNITED STATES PATENT OFFICE.

EDWARD A. SCHREIBER, OF CHICAGO, ILLINOIS, ASSIGNOR TO VAPOR CAR HEATING COMPANY, INC., OF CHICAGO, ILLINOIS, A CORPORATION OF NEW YORK.

HOSE-COUPLING.

1,350,083.  Specification of Letters Patent.  Patented Aug. 17, 1920.

Application filed March 6, 1919. Serial No. 280,944.

*To all whom it may concern:*

Be it known that I, EDWARD A. SCHREIBER, a citizen of the United States, residing at Chicago, in the county of Cook and State of Illinois, have invented certain new and useful Improvements in Hose-Couplings, of which the following is a specification.

My invention relates to a hose coupling, and more particularly to a hose coupling for railway steam train pipes of the straight port, gravity type provided with positively operating means for forcing the coupler heads together and holding them in locked engagement. The increased length of trains with consequent increase in the pressure of steam and in the diameter and stiffness of the coupling hose has made it imperative to employ some positive locking means for keeping the coupler heads in engaged relation. The coupler heads are first brought into alinement with each other by an oscillatory movement on their so-called interlocking cams and are then locked, by a locking device, against the tendency to separate under steam pressure or the tautening of the hose. It has been customary in couplers of the straight port, gravity type to use tubular gaskets of rubber composition, or the like, which are made sufficiently long so that they will expand when subjected to the heat of the steam to make a tight joint. These gaskets are quite costly and their life is very short, frequently not longer than a few weeks or even a few days; and this is particularly so if they are used in couplers having positive locks. With the gaskets abutting and the coupler heads tightly locked together the natural expansion of the gaskets at high temperatures is checked with the result that after a time the compression destroys the capacity of the gasket to expand sufficiently to close the joint. The gasket becomes compressed or shrunk so that under moderate steam pressure, particularly, it fails to expand enough to make a tight joint with the gasket of the other coupler head.

The primary object of my invention is to remedy these difficulties and to provide an improved gasket which can be employed in the present installation as well as in new couplers in place of the rubber composition gaskets heretofore used. In carrying out the invention I make the gasket preferably of metal, for example, cast iron, and construct it in two parts or members connected to permit a rocking movement of the facing member by means of a simple and inexpensive arrangement which does not involve any obstruction of the steam port and which connects the parts so that the gasket may be handled as a unitary article.

The invention is illustrated, in certain preferred embodiments in the accompanying drawings wherein—

Figure 1 is a plan view of a railway steam train pipe hose coupling consisting of two identical coupler heads each provided with positive locking means.

Fig. 2 is a side elevation of the coupling.

Fig. 3 is a view, in perspective, of the two-part gasket of my invention.

Fig. 4 is a sectional view on line 4—4 of Fig. 1 showing the coupler heads provided wish gaskets like the one shown in Fig. 3.

Fig. 5 is a sectional view of the gasket, and

Figs. 6 and 7 are views similar to Fig. 5 illustrating slight modifications.

Like characters of reference designate like parts in the several figures of the drawings.

Referring to the drawings, the couplers, which are of known construction, are shown at 10. 11 are the nipples for the rubber hose (not shown). Each coupler is formed with a gasket recess 12. Each coupler head is formed with a locking arm 13 provided with a lug or cam 14 adapted to engage a lug or cam 15 on the side of the other coupler head. In making the coupling the couplers are tilted upwardly, their locking cams are engaged and they are then rocked downwardly to bring the ports of the couplers into alinement. Each coupler is furnished with a positive lock consisting, in the type of coupler shown, of a revoluble member 16 having a beveled eccentric end 17 adapted to bear on an inclined surface 18 on the arm of the mating member of the coupling. These parts are all of familiar construction.

The gasket comprises a tapered tubular member 19, preferably of cast iron, adapted to fit the recess 12 of the coupler. This member is formed with a groove 20 for a revoluble keeper 21 which is formed with a notch 22 so that by turning the keeper the gasket may be removed from the coupler head. The outer end of the tubular member 19 is concave, as indicated at 23, to receive the other or facing member 24 of the gasket, which is also preferably made of cast iron, and the inner surface of which is curved to fit the curved or recessed end of the tubular member. The two members of the gasket are fastened together by means of clips 25 which lie in pairs of alining grooves 26 formed in the gasket members. The clips have their extremities 27 bent toward each other and adapted to fit into oblique holes 28 drilled in the gasket members at the extremities of the grooves. The clips 25 are diametrically arranged with respect to each other and are in horizontal alinement, that is, at the sides of the gasket regarding the top as the part formed with groove 20. This connection made by the clips is sufficiently close to hold the parts of the gasket together in shipment and handling but is loose enough so that the facing member will have a slight oscillatory movement which will permit it to be shifted during coupling and uncoupling operations. It will be understood that the oscillatory movement of the coupler heads in coupling and uncoupling are up and down movements. The facing members of the gaskets must move correspondingly and for this reason the clips are most conveniently arranged at the sides of the gasket.

It will be seen that by making the gasket in two parts or members giving the outer member capacity for slight oscillatory movements, it is possible to employ a non-resilient material such as cast iron or other metal which is cheaper and much more durable than the rubber composition ordinarily used for hose coupler gaskets. The fact that the coupler heads are forced together positively by wedging action makes it possible to obtain a tight joint between the gaskets without relying upon any expansion of the material of the gaskets. When the gasket is in place in the coupler head the wire clips 25 obviously cannot become disengaged from the parts which they serve to connect.

In Fig. 6 I have shown a gasket in which the tubular member 19ª is formed at its inner end with a groove 29 to receive washer 30 of rubber or other resilient material.

In Fig. 7 the tubular member 19ᵇ has cemented thereto a flat washer 31. The purpose of these washers, which, under ordinary circumstances are probably not needed, is to insure a tight joint between the gasket and the coupler head.

I claim:

1. In a coupler of the gravity type, the combination with a coupler head provided with means for positively forcing and holding the same pressed against a mating coupler, of a gasket for said coupler consisting of a tubular member adapted to fit into the port of the coupler head, an annular facing member, both said members being made of substantially non-compressible metal, and means providing an engagement between said members which permits the facing member to oscillate on the other member during coupling and uncoupling operations.

2. In a coupler of the gravity type, the combination with a coupler head provided with means for positively forcing and holding the same pressed against a mating coupler, of a gasket for said coupler comprising a tubular member and an annular facing member, said members being composed of substantially incompressible metal and having curved surfaces of contact with each other, and means providing an engagement between said members which permits the facing members to oscillate on each other during coupling and uncoupling operations.

3. In a coupler of the gravity type, the combination with a coupler head provided with means for positively forcing and holding the same pressed against a mating coupler, of a gasket for said coupler consisting of a metal tubular member adapted to fit into the port of the coupler head, an annular metal facing member, and means providing an engagement between said members which does not obstruct the port of the gasket and permits the facing member to oscillate on the other member during coupling and uncoupling operations.

4. In a coupler of the gravity type, the combination with a coupler head provided with means for positively forcing the same against a mating coupler, of a gasket for said coupler comprising a metal tubular member and an annular metal facing member, said members having curved surfaces of contact with each other, means for holding the tubular member non-rotatively in the port of said coupler head, and a pair of wire clips engaging the gasket members at points in horizontal alinement on opposite sides of the gasket whereby the facing member may oscillate during coupling and uncoupling operations.

5. The combination with a hose coupler having a gasket recess, of a gasket comprising a tubular member, an annular facing member having capacity for oscillatory movement on the tubular member, and oppositely disposed clips for engaging the facing member with the tubular member; said gasket being arranged in said recess so as to prevent said clips from becoming disengaged from the gasket.

6. A hose coupler gasket comprising a tubular member and an annular facing member, said members having curved surfaces of contact, and wire clips having bent extremities for engaging the facing member with the tubular member.

7. A hose coupler gasket comprising a tubular member and an annular facing member, said members having curved surfaces of contact and being formed with alining grooves, converging holes at the ends of said grooves, and wire clips in said grooves having their extremities bent so as to extend into said holes for engaging the facing member with the tubular member.

EDWARD A. SCHREIBER.